Patented Feb. 8, 1944

2,341,427

UNITED STATES PATENT OFFICE 2,341,427

AZO COMPOUNDS AND MATERIALS COLORED THEREWITH

Joseph B. Dickey and James G. McNally, Rochester, N. Y., assignors to Eastman Kodak Company, Rochester, N. Y., a corporation of New Jersey No Drawing. Application March 3, 1942, Serial No. 433,166

11 Claims. (Cl. 260—155)

This invention relates to arylazo compounds of a lilolidine and their application to the art of dyeing or coloring. More particularly, it relates to azo compounds having the general formula:

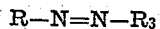

wherein R—N=N— represents the residue of a diazotized member selected from the group consisting of an arylamino group of the benzene series or an arylamino group of the naphthalene series and $R_3$ represents a lilolidine coupling component having the general formula:

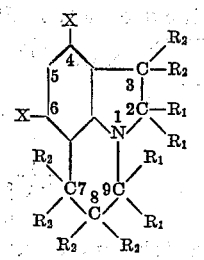

wherein $R_1$ represents a member selected from the group consisting of hydrogen and an alkyl group, $R_2$ represents a member selected from the group consisting of hydrogen, an alkyl group and the group $OR_4$, wherein $R_4$ represents a member selected from the group consisting of hydrogen, an alkyl group, and an acid radical of phosphorus or sulphur, and X represents a member selected from the group consisting of hydrogen, an alkyl group, an alkoxy group, a halogen and a hydroxyl group.

It will be understood that "alkyl" as used herein, unless otherwise indicated, includes not only unsubstituted alkyl groups such as a methyl group, an ethyl group, a propyl group or butyl group, but also substituted alkyl groups such as β-hydroxyethyl, β,γ-dihydroxypropyl, β-methoxyethyl or β-ethoxyethyl, for example. Similarly, the term "alkoxy" includes not only unsubstituted alkoxy groups such as methoxy, ethoxy, propoxy or butoxy, but also substituted alkoxy groups such as β-methoxyethoxy, β-ethoxyethoxy or β'-hydroxyethyl-β-ethoxy, for example. Illustrative of halogen may be mentioned chlorine, bromine and iodine. Further, by "an acid radical of phosphorus or sulfur" is meant such radicals, for example, as $-SO_3H$, $-P(OH)_2$, $-PO(OH)_2$, $-P(OH)OCH_3$ and $-PO(OH)OC_2H_5$.

Both sulfonated and non-sulfonated compounds are included within the scope of our invention. The nuclear non-sulfonated compounds have, however, been found to be of particular value for the dyeing of organic derivatives of cellulose and it is these compounds and their application thereto that our invention is primarily directed. These nuclear non-sulfonated compounds also possess some affinity for wool and silk. For the dyeing of cellulose acetate, for example, nuclear non-sulfonated dye compounds wherein R is an aryl nucleus of the benzene series are generally advantageous. In the case of the dye compounds containing sulphonic acid groups on the nucleus, it has been found that these dyes have little or no utility for the dyeing of organic derivatives of cellulose, but do possess considerable capacity for dyeing materials of regenerated cellulose, cotton, silk and wool. Compounds of our invention containing a nuclear free carboxylic acid group likewise possess some utility for the dyeing of these latter named materials. Preferably, however, for the dyeing of organic derivatives of cellulose, the dye compound employed should contain no nuclear free carboxylic acid group. We have found that the compounds above described constitute a valuable series of dyes, which produce on various textile materials, colors ranging from violet to red which are stable to light, to washing and to atmospheric conditions.

It is an object of our invention, therefore, to provide the new class of dye compounds above described. A further object is to provide a process for the dyeing or coloration of organic derivatives of cellulose. Another object is to provide dyed textile materials made of or containing an organic derivative of cellulose which are of good fastness to light, washing and atmospheric conditions.

The dye compounds of our invention may be prepared by coupling the diazo derivative of an arylamine of the benzene or naphthalene series with lilolidine or with a lilolidine substituted as indicated. The lilolidine intermediates can be prepared according to the general procedures described in Berichte der Deutschen Chemischen Gesellschaft, vol. 26, page 1291 (1893); vol. 51, page 1219 (1918); and J. Amer. Chem. Soc., vol. 42, page 1720 (1920).

The following examples illustrate further the preparation of the azo dye compounds of our invention:

PART I.—DYES FOR ORGANIC DERIVATIVES OF CELLULOSE

*Example 1*

1 gram mole of p-amino-ω-hydroxyacetophenone was diazotized in the usual manner with sodium nitrite, in the presence of hydrochloric acid at a temperature approximating 0–5° C., and was then added with stirring to a cold dilute hydrochloric acid solution containing 1 gram mole of lilolidine. Coupling was completed by adding sodium acetate. The precipitate of the dye which formed was filtered off, washed with water and dried. It colored cellulose acetate orange shades from an aqueous suspension.

*Example 2*

1 gram mole of p-aminoacetophenone was diazotized and coupled with 1 gram mole of 2-methyl-8-hydroxylilolidine following the procedure of Example 1. The dye obtained colored cellulose acetate orange shades from an aqueous suspension, and had the structural formula:

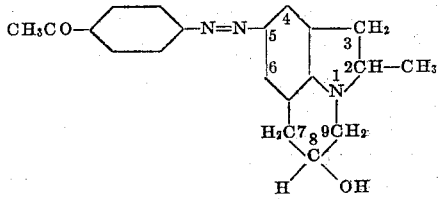

In place of 2-methyl-8-hydroxylilolidine there can be substituted 8-hydroxylilolidine, or any other substituted 8-hydroxylilolidines which have a free hydrogen in the 5-position.

*Example 3*

1 gram mole of 2-hydroxy-4-nitro aniline was diazotized in the usual manner with sodium nitrite and hydrochloric acid and then coupled by adding it slowly with stirring to a well iced aqueous solution of 1 gram mole of 2,3-dimethyl-8-sulfatolilolidine. Concurrently with the addition of the diazo solution, there was added an aqueous solution of sodium carbonate at a rate just sufficient to keep the mixture alkaline to litmus paper. When the coupling was complete, the dye was salted out, filtered off and dried. The dye colored cellulose acetate, silk and wool magenta shades from an aqueous solution which contained salt. In place of the sulfato group, there can be substituted other acid groups such as the phosphito group and the phosphato group.

The following tabulation further illustrates compounds included within the scope of our invention together with the color they produce on cellulose acetate silk. The compounds indicated in the table may be prepared by diazotizing the amines listed under the heading "Amine" and coupling the diazonium compounds obtained with the compounds specified in the column entitled "Coupling component." The diazotization and coupling reactions may, for example, be carried out following the general procedures described in Examples 1–3.

| Amine | Coupling component | Color on acetate acetate silk |
|---|---|---|
| p-Nitroaniline | 3, 8-dihydroxy-lilolidine | Rubine. |
| p-Nitro-o-cyanoaniline | ....do.... | Violet. |
| p-Nitro-o-methylaniline | ....do.... | Rubine. |
| p-Nitro-o-methoxyaniline | ....do.... | Do. |
| p-Nitro-o-chloraniline | 3, 8-dihydroxy-6-Methyl-lilolidine | Violet. |
| 2, 4-dinitroaniline | 3-methyl-6-methoxy-8-hydroxy-lilolidine | Purple. |
| 2, 4-dinitro-6-chloraniline | 3, 7-dihydroxy-6-methyl-lilolidine | Reddish-blue. |
| 2, 4-dinitro-6-hydroxyaniline | ....do.... | Blue. |
| p-Aminoazobenzene | 4-methyl-8-methoxy-lilolidine | Red. |
| 2-amino-3, 5-dinitrophenyl-methylketone | 3, 7-dihydroxy-3, 7-dimethyl-lilolidine | Blue. |
| 2-amino-3, 5-dinitrophenyl-methylsulfone | ....do.... | Do. |
| 2-amino-5-nitrobenzene sulfon glycerylamide | ....do.... | Violet. |
| 2-amino-3, 5-dinitrobenzene sulfon-β-hydroxyethylamide | ....do.... | Blue-green. |
| 4-nitro-1-naphthylamine | ....do.... | Violet. |

PART II.—DYES FOR REGENERATED CELLULOSE, COTTON, SILK, AND WOOL

*Example 4*

1 gram mole of 2-amino-5-nitrobenzenesulfonic acid was diazotized with hydrochloric acid and sodium nitrite, and coupled with 1 gram mole of lilolidine by adding the diazo solution to a well iced hydrochloric acid solution of the base. The coupling reaction was completed by adding sodium carbonate to the mixture. The dye was salted out, filtered off and dried. It colored regenerated cellulose, cotton, silk and wool rubine shades from an aqueous solution containing salt. The formula of the dye was as follows:

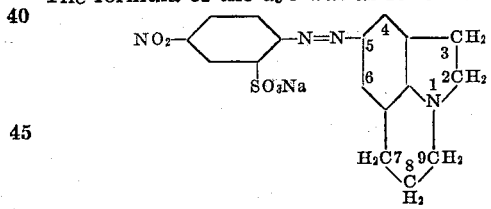

The following tabulation further illustrates compounds included within the scope of our invention, together with the color they produce on regenerated cellulose, cotton, silk, and wool materials. The compounds indicated below may be prepared by diazotizing the amines listed under the title "Amine" and coupling the diazonium compound obtained with the compounds specified under the title "Coupling component." The diazotization and coupling reaction may, for example, be carried out following the general procedure of Example 4.

| Amine | Coupling component | Color on regenerated cellulose, cotton, silk and wool |
|---|---|---|
| 2-amino-3, 5-dinitro-benzene sulfonic acid | Lilolidine | Reddish-blue. |
| Dianisidine disulfonic acid (1 mole) | 2, 3-dimethyl-6, 8-dihydroxy-lilolidine (2 moles) | Red. |
| 4-amino-2-methyl-2'-sulfonic acid-4'-nitro-azobenzene | 2,3-dibutyl-8-sulfato lilolidine | Rubine. |
| 1-amino-8-naphthol 2, 4-disulfonic acid | 3-acetoxy-7-phosphito-6-methyl-lilolidine | Blue. |
| 3, 5-dinitro-anthranilic acid | 7-sulfato-6-methyl-lilolidine | Do. |

It will be understood that the specific dye compounds given hereinbefore are intended to be illustrative and not limitative of the invention. Any of the amines disclosed herein may be diazotized and the diazonium compounds obtained coupled with any of the coupling components shown herein to obtain dye compounds included within the scope of our invention. Where the particular dye is water-soluble, it will ordinarily be applied directly to wool, silk, cotton, regenerated cellulose, and in some cases, where the solubilizing group is attached to the dye molecule through a sidechain, to organic derivatives of cellulose textile materials from aqueous solutions of the dye which may contain salt, without the necessity of using a dispersing or solubilizing agent. Those dye compounds which are insoluble in water are applied most advantageously from aqueous suspensions prepared by grinding the dye with a dispersing agent to a homogeneous paste and then dispersing the paste in water or in a dilute aqueous soap solution. For a more complete description of how the water-insoluble azo dye compounds of our invention can be employed for the dyeing of organic derivatives of cellulose reference may be had to our U. S. Letters Patent No. 2,115,030, issued April 26, 1938. It will be understood, of course, that the above remarks concerning the application of the dye compounds of our invention are merely illustrative and that any of the customary methods for applying dyes of the character here involved to textile fibers can be employed.

While our invention has been illustrated more particularly in connection with the dyeing of cellulose acetate silk, it will be understood that materials made of or containing other organic derivatives of cellulose are likewise included within the scope of this invention including the hydrolyzed, as well as the unhydrolyzed organic acid esters, represented by cellulose formate, cellulose propionate, cellulose butyrate, cellulose acetate-propionate, cellulose acetate-butyrate, methyl cellulose, ethyl cellulose, benzyl cellulose, and the like.

We claim:

1. The azo dye compounds having the general formula:

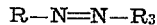

wherein R—N=N— represents the residue of a diazotized member selected from the group consisting of an arylamino compound of the benzene series, and an arylamino compound of the naphthalene series and $R_3$ represents the residue of a lilolidine coupling component.

2. The azo dye compounds having the general formula:

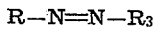

wherein R represents the residue of an aryl nucleus of the benzene series and $R_3$ represents the residue of a lilolidine coupling component.

3. The azo dye compounds having the general formula:

wherein R represents the residue of an aryl nucleus of the naphthalene series and $R_3$ represents the residue of a lilolidine coupling component.

4. The azo dye compounds having the general formula:

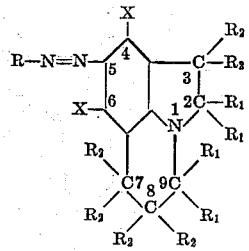

wherein R—N=N— represents the residue of a diazotized member selected from the group consisting of an arylamino compound of the benzene series and an arylamino compound of the naphthalene series, $R_1$ represents a member selected from the group consisting of hydrogen and an alkyl group, $R_2$ represents a member selected from the group consisting of hydrogen, an alkyl group and the group $OR_4$, wherein $R_4$ represents a member selected from the group consisting of hydrogen, an alkyl group, an acid radical of phosphorus and an acid radical of sulphur, and X represents a member selected from the group consisting of hydrogen, a halogen, hydroxyl, and an alkoxy group.

5. Textile material colored with an azo dye compound having the general formula:

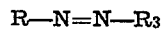

wherein R—N=N— represents the residue of a diazotized member selected from the group consisting of an arylamino compound of the benzene series and an arylamino compound of the naphthalene series, and $R_3$ represents a lilolidine coupling component.

6. An organic derivative of cellulose colored with a nuclear non-sulfonated azo dye compound having the general formula:

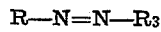

wherein R—N=N— represents the residue of a diazotized member selected from the group consisting of an arylamino compound of the benzene series and an arylamino compound of the naphthalene series, and $R_3$ represents a lilolidine coupling component.

7. A cellulose acetate material colored with a nuclear non-sulfonated azo dye compound having the general formula:

wherein R—N=N— represents the residue of a diazotized member selected from the group consisting of an arylamino compound of the benzene series and an arylamino compound of the naphthalene series, and $R_3$ represents a lilolidine coupling component.

8. A cellulose acetate material colored with a nuclear non-sulfonated azo dye compound having the general formula:

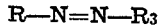

wherein R represents the residue of an aryl nucleus of the benzene series and $R_3$ represents the residue of a lilolidine coupling component.

9. The azo dye compounds having the general formula:

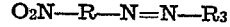

wherein R represents the residue of an aryl nucleus of the benzene series and $R_3$ represents the residue of a lilolidine coupling component.

10. The azo dye compounds having the general formula:

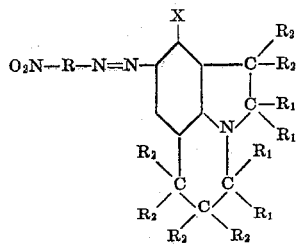

wherein R represents the residue of an aryl nucleus of the benzene series, $R_1$ represents a member selected from the group consisting of hydrogen and an alkyl group, $R_2$ represents a member selected from the group consisting of hydrogen, an alkyl group and the group —$OR_4$, wherein $R_4$ represents a member selected from the group consisting of hydrogen, an alkyl group, an acid radical of phosphorus and an acid radical of sulphur, and X represents a member selected from the group consisting of hydrogen, a halogen, hydroxyl and an alkoxy group.

11. The azo dye compounds having the general formula:

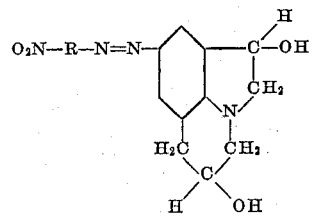

wherein R represents the residue of an aryl nucleus of the benzene series.

JOSEPH B. DICKEY.
JAMES G. McNALLY.